US 6,557,235 B1

United States Patent
Katz et al.

(10) Patent No.: US 6,557,235 B1
(45) Date of Patent: May 6, 2003

(54) BI-AXIAL COPLANAR APPARATUS

(75) Inventors: Reuven R. Katz, Haifa (IL); Yoram Koren, Ann Arbor, MI (US); François R. Pierrot, St. Jean de Vedas (FR); Zhe Li, East Lansing, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/092,272

(22) Filed: Mar. 6, 2002

(51) Int. Cl.[7] .............................. B23C 1/12; B23D 7/00; B65G 00/00

(52) U.S. Cl. ..................... 29/563; 409/201; 409/204; 409/211; 409/216; 409/235; 414/749.6; 414/749.1; 414/751.1

(58) Field of Search ................................. 409/201, 204, 409/211, 216, 235; 74/579 R, 479.01, 490.01, 490.03, 490.07, 490.08, 490.09, 490.1; 414/749.6, 749.1, 751.1

(56) References Cited

U.S. PATENT DOCUMENTS

| 4,732,525 A | | 3/1988 | Neumann | |
|---|---|---|---|---|
| 5,195,388 A | * | 3/1993 | Zona et al. | 74/479.01 |

(List continued on next page.)

FOREIGN PATENT DOCUMENTS

| EP | 1 084 802 A2 | 3/2001 |
|---|---|---|
| EP | 1 084 802 A3 | 7/2001 |
| WO | WO 99/38646 A1 | 8/1999 |
| WO | WO 99/61198 A2 | 12/1999 |
| WO | WO 00/09285 A3 | 2/2000 |
| WO | WO 00/09285 A2 | 2/2000 |
| WO | WO 00/45991 A1 | 8/2000 |

OTHER PUBLICATIONS

Stiffness Analysis of Re–Configurable Parallel Mechanisms with Prismatic Actuators, Dan Zhang, Fengfeng Xi and Chris K. Mechefske, Proceedings of CIRP 1st International Conference on Agile, Reconfigurable Manufacturing, Ann Arbor Michigan USA, Monday, May 21, 2001.

Optimization of Re–Configurable Parallel Mechanisms with Revolute Actuators, Dan Zhang, Fengfeng Xi and Chris K. Mechefske, Proceedings of CIRP 1st International Conference on Agile, Reconfigurable Manufacturing, Ann Arbor, Michigan USA, Monday, May 21, 2001.

Reconfiguration Capabilities of Single–Purpose Machine Tools Based on parallel Kinematic Structures, Neugebauer, R.; Ihlenfeldt, St.; Weidermann, F.; Kirchner, J., Proceedings of CIRP 1st International Conference on Agile, Reconfigurable Manufacturing, Ann Arbor, Michigan USA, Monday, May 21, 2001.

(List continued on next page.)

*Primary Examiner*—William Briggs
*Assistant Examiner*—Dana Ross
(74) *Attorney, Agent, or Firm*—Kirkpatrick & Lockhart LLP

(57) ABSTRACT

An apparatus comprising a frame, a mobile platform and first and second linearly-actuated slides supported on a base connected to the frame. The first and second slides are movable along a line defining a first axis. The apparatus may include a first driving connector movably coupled to the first slide and to the mobile platform, and a second driving connector movably coupled to the second slide and to the mobile platform, such that the mobile platform is displaceable within at least two degrees of freedom defined by linear motions along the first axis and a second axis, the second axis being coplanar and orthogonal to the first axis. An end effector may be also coupled to the mobile platform, the end effector having an axis aligned in a direction defined by the second axis. The end effector may comprise, for example, a tool or a gripper.

18 Claims, 12 Drawing Sheets

U.S. PATENT DOCUMENTS

| | | | |
|---|---|---|---|
| 5,333,514 | A | 8/1994 | Toyama et al. |
| 5,564,888 | A * | 10/1996 | Doan ..................... 414/751.1 |
| 5,575,597 | A | 11/1996 | Bailey et al. |
| 5,715,729 | A | 2/1998 | Toyama et al. |
| 5,857,815 | A | 1/1999 | Bailey et al. |
| 5,941,128 | A | 8/1999 | Toyama et al. |
| 5,980,360 | A | 11/1999 | Murray et al. |
| 6,026,703 | A | 2/2000 | Stanisic et al. |
| 6,043,621 | A | 3/2000 | Neumann |
| 6,120,290 | A | 9/2000 | Fukushima et al. |
| 6,135,683 | A | 10/2000 | Kim et al. |
| 6,161,992 | A | 12/2000 | Holy et al. |
| 6,196,081 | B1 | 3/2001 | Yau |
| 6,203,254 | B1 | 3/2001 | Nashiki et al. |
| 6,374,156 | B1 * | 4/2002 | Shimogama et al. ....... 700/245 |
| 6,428,267 | B1 * | 8/2002 | Terpstra ................... 414/749.6 |

OTHER PUBLICATIONS

Parellel Kinematic Machine Research at NIST: Past, Present, and Future, Albert J. Wavering, First European–American Forum on Parallel Kinematic Machines Theoretical Aspects and Industrial Requirements, Aug. 31–Sep. 1, 1998, Milan, Italy.

Machine Technology, http://www.isw.uni–stuttgart.de/english/department–4/dep–4–1.htm.

Sonderforschungsbereich, SFB 562, Robotersysteme für Handhabung und Montage, http://www.tu–bs.de/sfbs/sfb562/html/Home.html.

* cited by examiner

6,557,235 B1

BI-AXIAL COPLANAR APPARATUS

BACKGROUND

Recent developments in manufacturing have been directed to robots, manipulators or machines that are designed to operate with closed-loop mechanisms, such as parallel mechanisms. Parallel mechanisms incorporate several independent kinematic chains that include an assemblage of links and joints interconnected such that the links are substantially free from bending moments.

Parallel kinematic machines, i.e. machines that are based on parallel mechanisms, and parallel robots are capable of operating at high speed and acceleration, and combine high rigidity with high flexibility and accuracy. Prior art parallel robots include a traveling plate or mobile platform that can operate with many degrees of freedom, but also require an equivalent number of costly actuators.

U. S. Pat. Nos. 5,333,514 and 5,857,815, for example, disclose parallel robots or manipulators with six degrees of freedom. European Patent Application EP 1 084 802 A2 discloses a parallel robot with four degrees of freedom. U.S. Pat. No. 6,161,992 discloses a machining system with a parallel mechanism having three degrees of freedom.

SUMMARY

One embodiment of the invention provides an apparatus comprising a frame, a mobile platform and first and second linearly-actuated slides supported on a base connected to the frame. The first and second slides are movable along a line defining a first axis. The apparatus may include a first driving connector movably coupled to the first slide and to the mobile platform, and a second driving connector movably coupled to the second slide and to the mobile platform, such that the mobile platform is displaceable within at least two degrees of freedom defined by linear motions along the first axis and a second axis, the second axis being coplanar and orthogonal to the first axis. An end effector may be also coupled to the mobile platform, the end effector having an axis aligned in a direction defined by the second axis. The end effector may comprise, for example, a tool or a gripper.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE INVENTION

Figure 1:
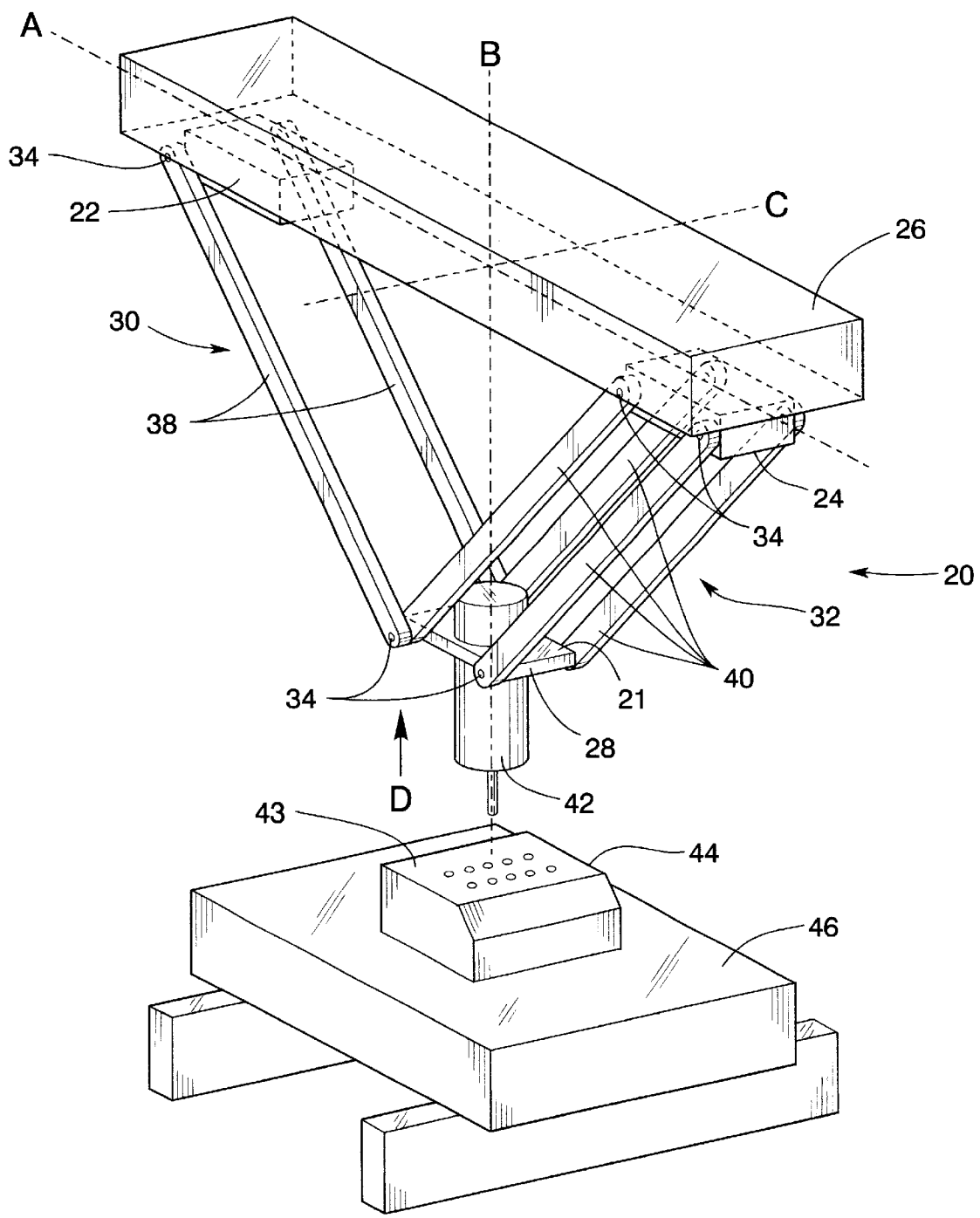
FIG. 1 is a perspective view of an embodiment of a parallel mechanism device according to the present invention, shown in a first position.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "upward" or "downward", are relative characterizations only based upon the particular position or orientation of a given component for a particular application.

Figure 2:
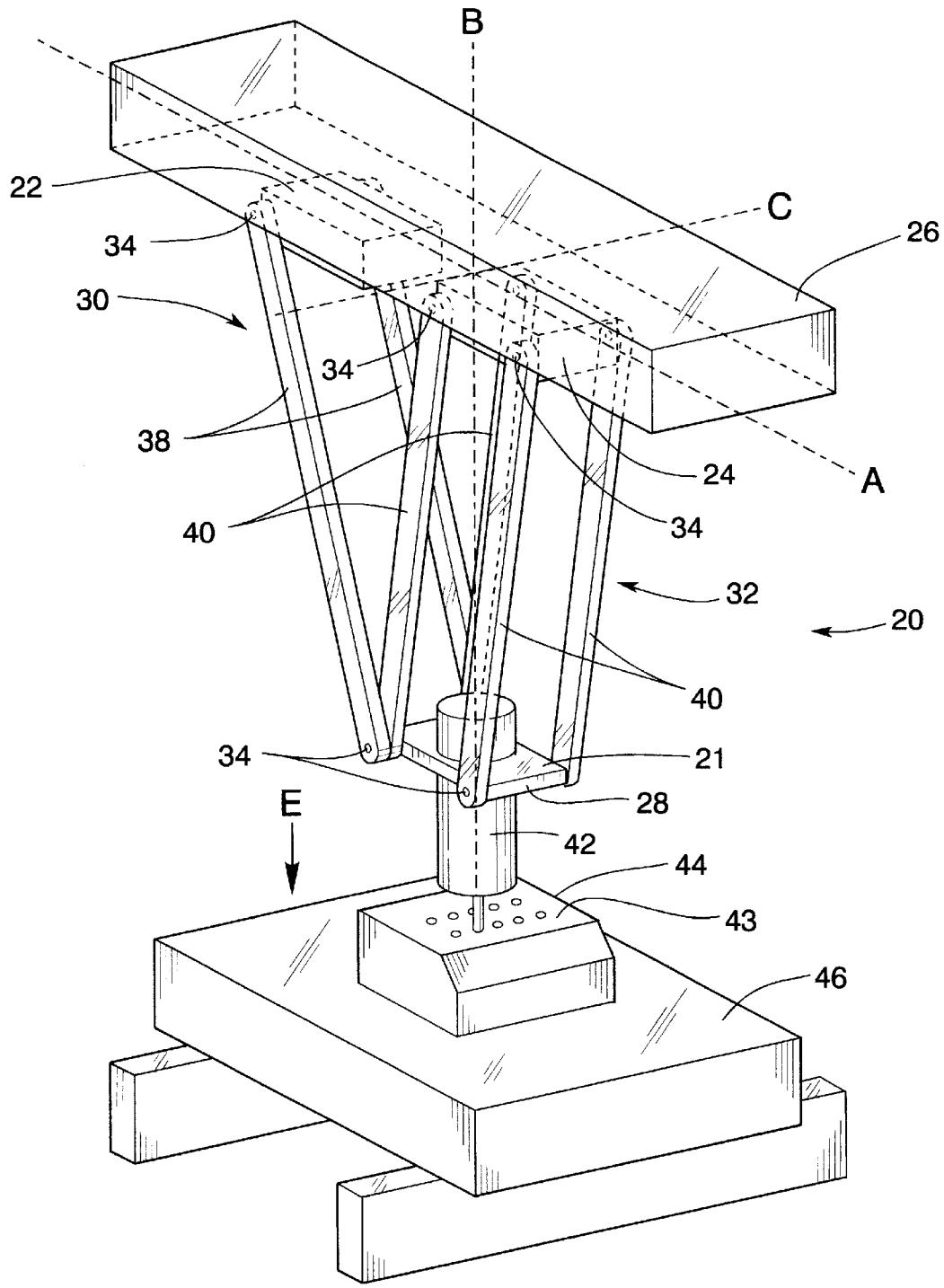
FIG. 2 is a perspective view of the parallel mechanism device of FIG. 1, shown in a second position.
Figure 3:
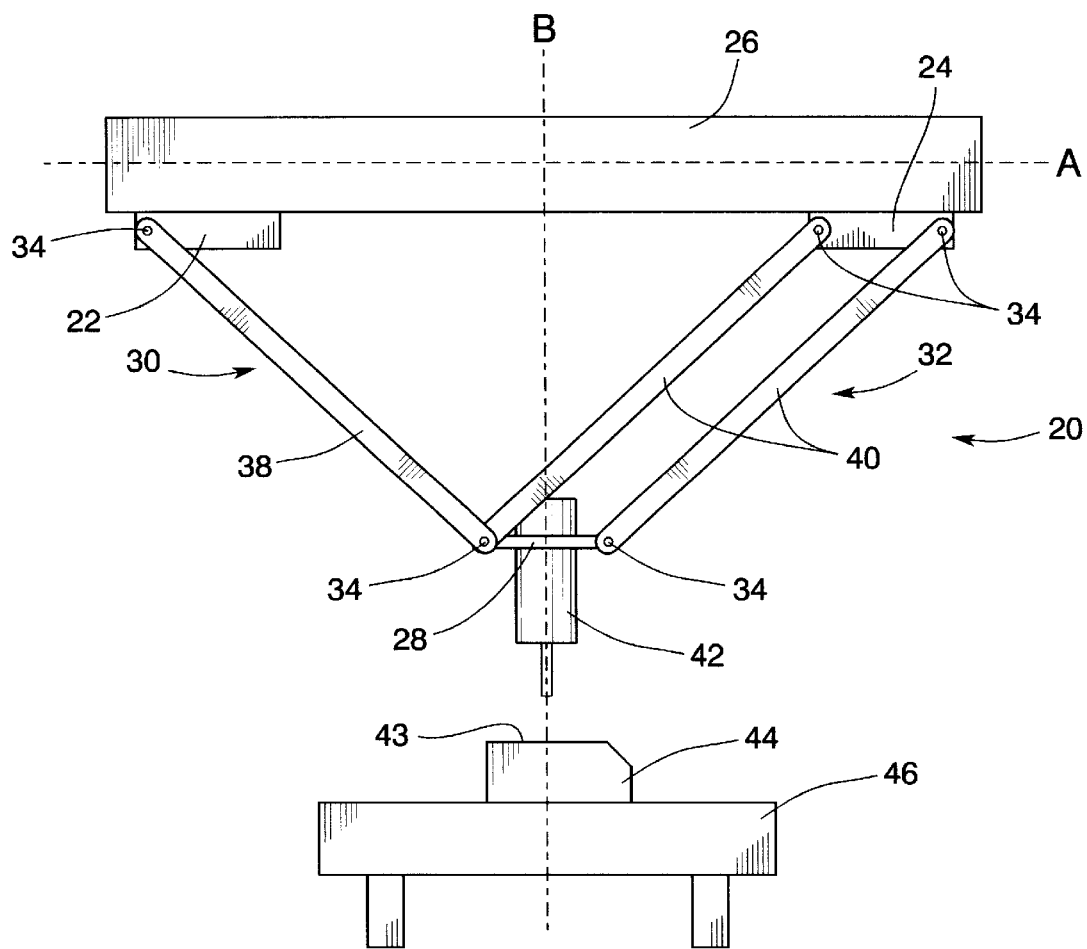
FIG. 3 is a front view of the parallel mechanism device of FIG. 1.

FIGS. 1–3 depict one embodiment of a parallel mechanism device 20. The parallel mechanism device 20 may include a mobile platform 28, such as a traveling plate, and a base 26 that supports a first slide 22 and a second slide 24. The first and second slides 22, 24 may be actuated by linear motors (not shown). The mobile platform 28 may be, for example, a rectangular plate. It will be appreciated that the mobile platform need not be plate-like or rectangular and other structures or shapes may be used depending on the particular application.

A first driving connector 30 may be pivotably coupled with the first slide 22 and with the mobile platform 28 through revolute joints or bearings 34. The revolute joints may be any pivot joints that permit rotation about at least one axis. A second driving connector 32 may be pivotably coupled with the second slide 24 and with the mobile platform 28 through revolute joints 34 that permit rotation about at least one axis. Each of the first and second driving connectors 30, 32, may comprise one or more first and second links 38, 40, respectively, as is described herein below. The first and second links 38, 40 are, for example, lightweight and low inertia structures, and transmit substantially tensile or compressive forces, and little or no torsion and bending moments. The mobile platform 28 may support a tool or end effector 42, such as, for example, a drill, including a high-speed tool spindle or other machining tool, and may also include a spray or powder gun, a welding torch, a laser, a glue dispenser, etc. The end-effector may be also be a gripper, for example in applications in which the parallel mechanism device 20 is used to transports parts from one machine to another.

The first and second slides 22, 24 may move linearly and independently of each other along a line of sliding that defines a first axis A. Each of the first and second slides 22, 24 may carry only its own weight and provide acceleration to the respective first and second driving connectors 30, 32, and to the mobile platform 28. Accordingly, the end effector 42, which is mounted on the mobile platform 28, may be capable of moving with relatively high acceleration.

When both slides 22, 24 move in the same direction along the first axis A, for example from left to right or from right to left, and at the same speed, such that the distance between them remains constant, the motion imparted to the mobile platform 28 through the first and second driving connectors 30, 32 is a linear motion of translation parallel to the first axis A.

When the first and second slides 22 and 24 move along the first axis A in opposite directions relative to each other, i.e. away from or toward each other, such that the distance between the first and second slides 22, 24 increases or decreases, the motion imparted to the mobile platform 28 through the first and second driving connectors 30, 32 is a linear motion along a second axis B. The second axis B may be coplanar and orthogonal to the first axis A when the motion of the slides 22 and 24 is collinear and at constant speed.

The mobile platform 28 may have a surface that is perpendicular to the second axis B. The second axis B may coincide with the axial axis of the end effector 42, as shown in FIG. 1, such that, for example, when the end effector 42 is a drill, the second axis B is the drilling axis that is perpendicular to a surface 21 of the mobile platform 28. It will be appreciated that in other applications the axis B may be perpendicular to the surface 21 of the mobile platform 28, but it may not coincide with the axis of the end effector 42, if the end effector is not oriented perpendicularly to the surface 21 of the mobile platform 28.

FIG. 1 shows the first and second slides 22, 24 in a first position in which they have moved apart from each other causing the end effector 42 to move along axis B "upward", i.e. in a direction away from an operable surface 43 of the workpiece 44, i.e. a surface on which the end effector 42 may operate (represented by arrow D in FIG. 1. FIG. 2 shows the first and second slides 22, 24 in a second position in which they have moved toward each other, causing the end effector 42 to move along axis B "downward", in a direction toward the operable surface 43 of the workpiece 44 (represented by arrow E in FIG. 2). Accordingly, the parallel mechanism device 20 provides two degrees of freedom to the motion of the mobile platform 28 and, therefore, to the end effector 42, which is mounted on the mobile platform 28. The two degrees of freedom comprise a linear motion parallel to the first axis A and a linear motion parallel to the second axis B.

Figure 4:
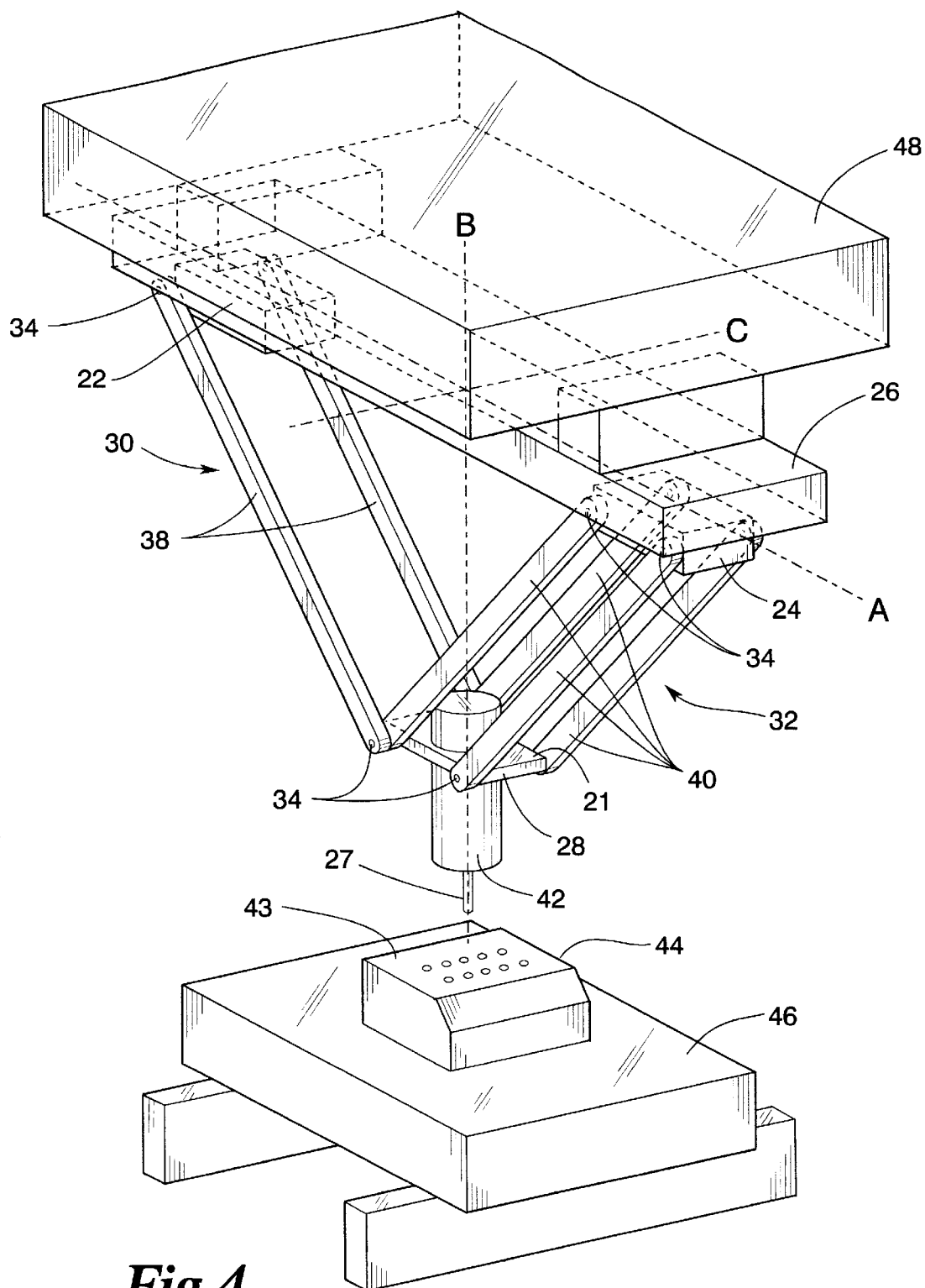
FIG. 4 is a perspective view of an embodiment of a parallel mechanism device according to the present invention.

A workpiece 44 may be supported on a table 46. The table 46 may be independently linearly actuated along a third axis C, which may be orthogonal to the first and second axes A, B. In another embodiment, shown in FIG. 4, the table 46 is not linearly actuatable along a third axis C, and instead the base 26 may be linearly actuated to move relative to a frame 48 in a direction parallel to the third axis C.

In the embodiment shown in FIGS. 1–3, the first driving connector 30 may comprise two first links 38, that may be parallel to each other, and the second driving connector 32 may comprise four second links 40, that may be parallel to each other. The numbers of first and second links 38, 40 that are included in the respective first and second driving connectors 30, 32 may depend on the configuration of the parallel mechanism device 20, such as, for example, the geometric shape and dimensions of the linear slides 22, 24 and of the mobile platform 28, as well as the positioning accuracy and bearing life that are desired.

The particular numbers of the first and second links 38, 40 included in the parallel mechanism device 20 may be chosen, for example, such that bending moments on the revolute joints 34 are minimized or avoided, or such that stresses in each of the first and second links 38 and 40 are reduced. The numbers of the first and second links 38, 40 may also be chosen such that the stability of motion of the mobile platform 28 in the direction of the second axis B is improved or that deviations from the orthogonality of the first and second axes A, B are minimized, for example in such situation as when the relative motions of the first and second slides 22 and 24 are substantially but not perfectly identical. The parallel mechanism device 20 shown in FIGS. 1–3 is simple in assembly and avoids all such problems.

The parallel mechanism device 20, for example, may be capable of high acceleration, such as, for example, of magnitude 10 g, if desired. Additionally, the parallel mechanism device 20 may provide high positioning accuracy for the end effector 42 for reasons that include the accuracy of the revolute joints 34 operating in a two-degree of freedom parallel kinematic mechanism, and the stability provided by the assemblage of the first and second links 38, 40.

Figure 5:
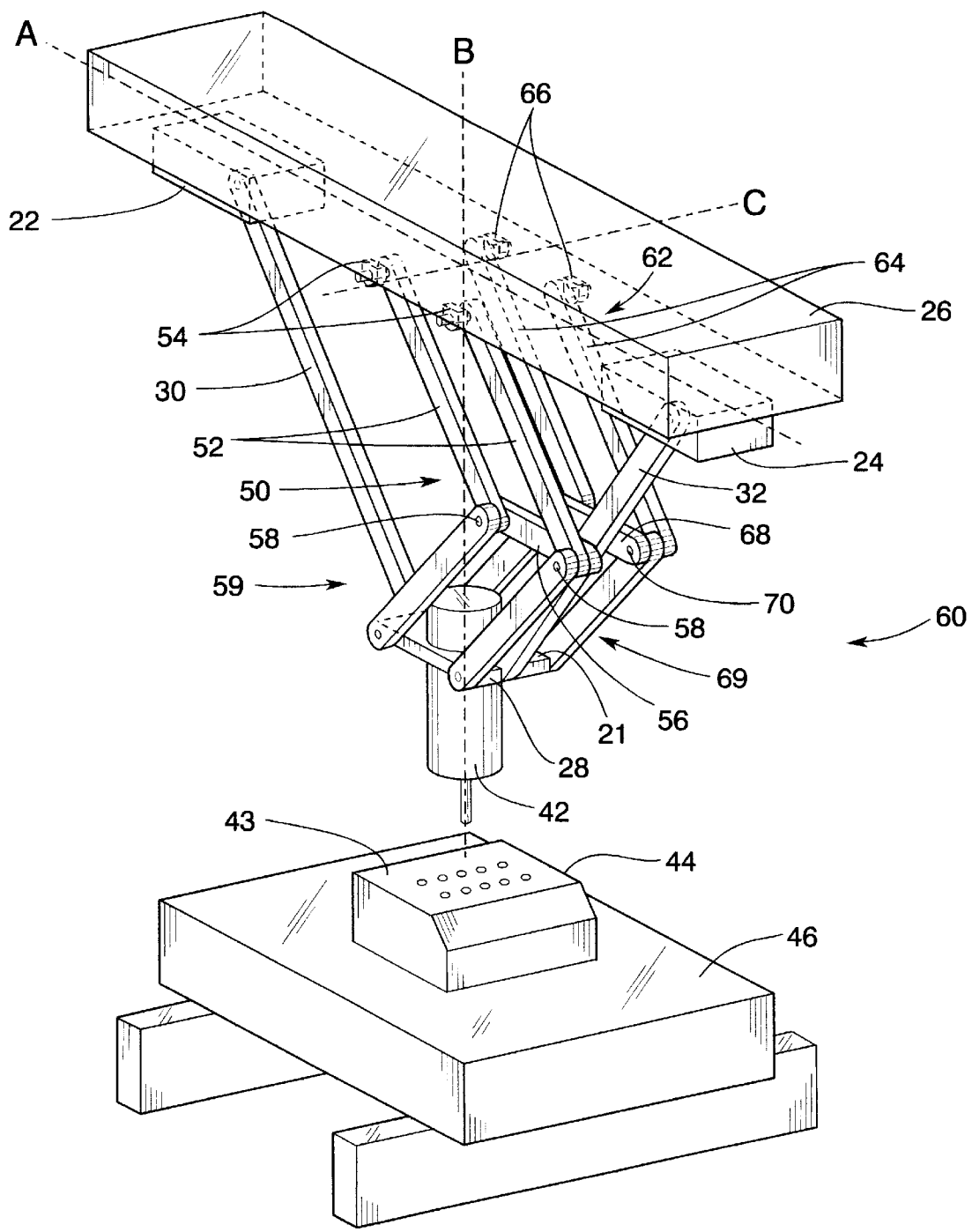
FIG. 5 is a perspective view of an embodiment of a parallel mechanism device according to the present invention.

Another embodiment 60 of the parallel mechanism device 20 may include, in addition to the first and second driving connectors 30, 32, a first guiding connector 50, as shown in FIG. 5. The first guiding connector 50 may, for example, comprise two first articulated links 52, which may be pivotably coupled to the mobile platform 28 and to a pair of first guideposts 54. The first articulated links 52 may be connected to each other through a first rod 56 that links them at their articulation joints 58, which may be pivot or revolute joints. The structure or framework comprising the first articulated links 52 and the first linking rod 56 may also be constructed as an integral first articulated component 59.

The embodiment 60 of the parallel mechanism device 20 shown in FIG. 5 may also include a second guiding connector 62. The second guiding connector 62 may also comprise two second articulated links 64, which are pivotably coupled to the mobile platform 28 and to a pair of second guideposts 66. The second articulated links 64 may be connected to each other through a second linking rod 68 that links them at their articulation joints 70, which may be pivot joints. The framework comprising the second articulated links 64 and the second linking rod 68 may also be constructed as an integral second articulated component 69.

In the embodiment of FIG. 5, as the first and second linear slides 22, 24 move toward or away from each other along a first axis A, the driving connectors 30 and 32 move the mobile platform correspondingly in opposite directions along a second axis B orthogonal to the first axis A, toward or away from the workpiece 44, for example, up or down when the second axis B is vertical. During such motion, the first and second guiding connectors 50, 62 stabilize the motion of the mobile platform 28 along the direction of the second axis B.

The embodiment 60 of the parallel mechanism device 20 may be operated with a table 46 which is linearly-actuated in a direction parallel to a third axis C, which is orthogonal to the first and second axes A, B. Alternatively, the base 26 of the parallel mechanism device 20 may be linearly actuated along the direction of the third axis C.

Figure 7:
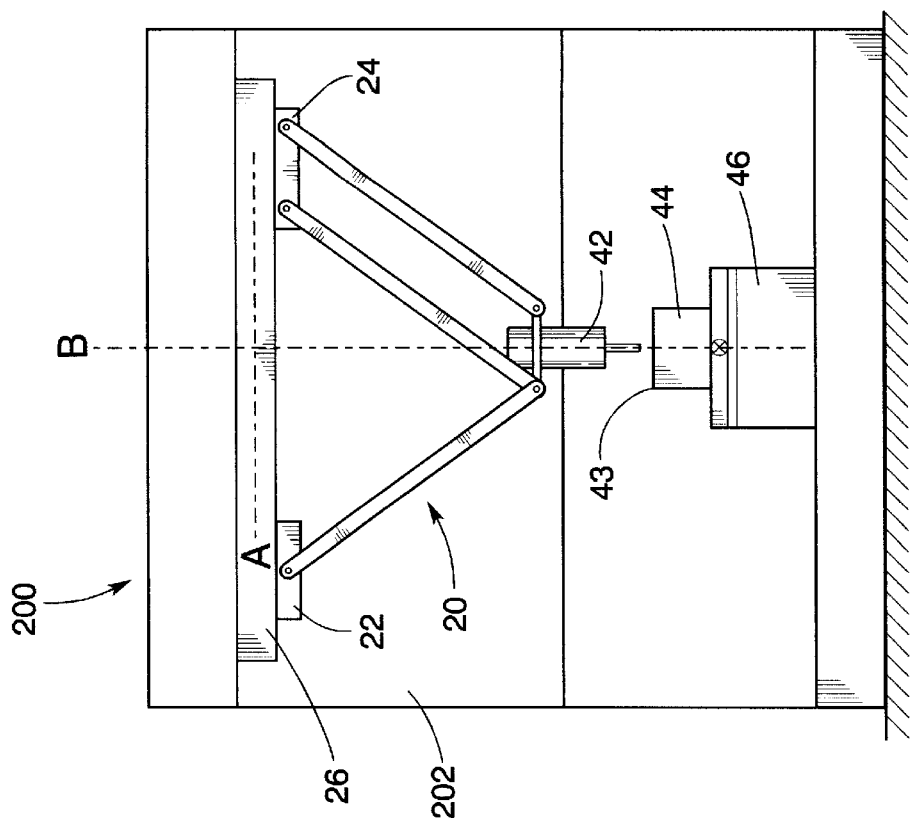
FIG. 7 is a front view of an embodiment of an apparatus according to the present invention.
Figure 6:
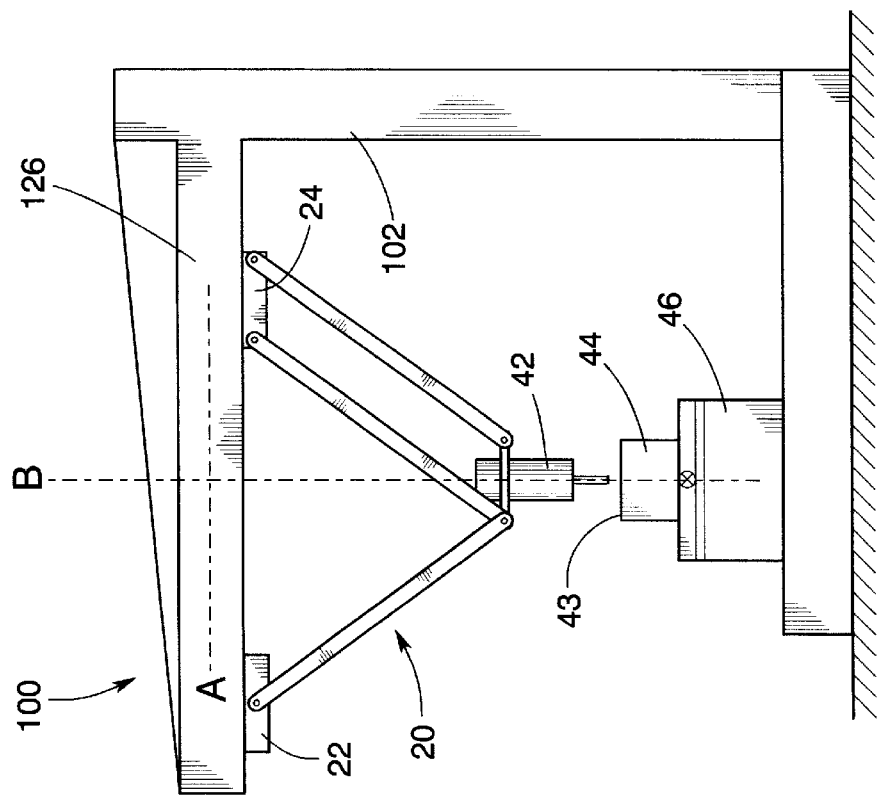
FIG. 6 is a front view of an embodiment of an apparatus according to the present invention.

FIG. 6 depicts an embodiment of an apparatus 100 that incorporates a parallel mechanism device 20. The apparatus 100 may be, for example, a high speed drilling machine in which the end effector 42 is a drill having a drilling axis aligned in a direction B. The direction B is coplanar and orthogonal to the direction A of the linear motion of the first and second slides 22, 24 of the parallel mechanism device 20. The apparatus 100 may include a frame 102 that provides a base 126 for the parallel mechanism device 20. FIG. 7 is another embodiment of an apparatus 200 in which the parallel mechanism device 20 is rotated 90° with respect to the frame 202 in comparison to the configuration shown in FIG. 6. In the embodiments 100 and 200 of FIGS. 6 and 7, the direction of drilling may be vertical for drilling on a horizontal operable surface 43 of the workpiece 44. It will be appreciated that oblique drilling, i.e., drilling in a direction that is not perpendicular to the operable surface of the workpiece 44, is also possible if desired.

Figure 8:
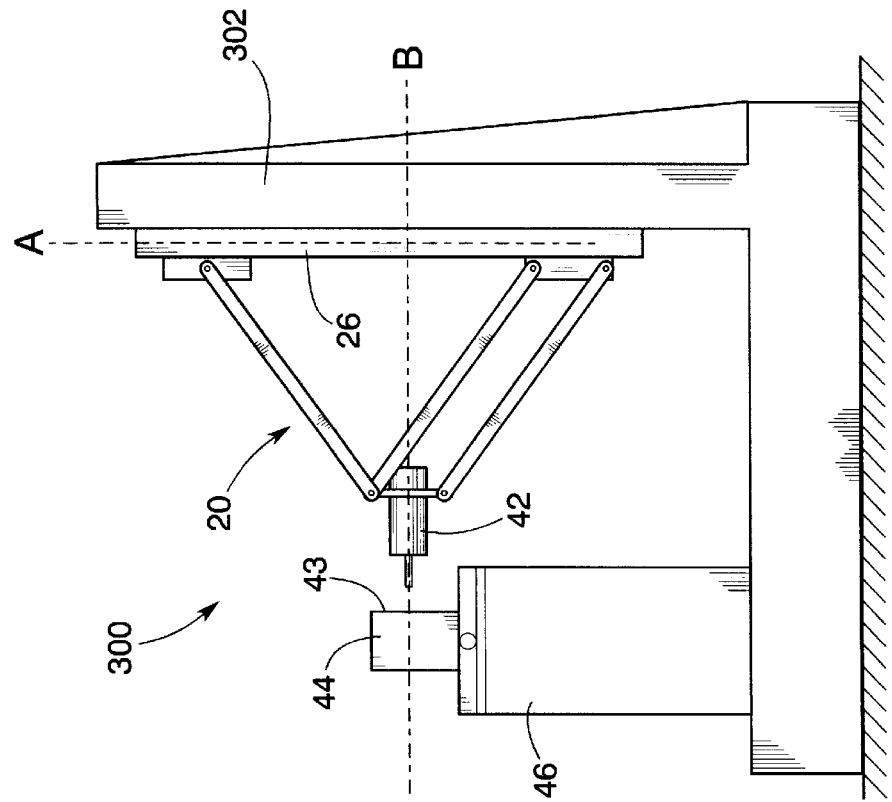
FIG. 8 is a front view of an embodiment of an apparatus according to the present invention.

FIG. 8 illustrates an embodiment of an apparatus 300 having a frame 302 and incorporating a parallel mechanism device 20. The parallel mechanism device 20 is supported on the frame 302 of the apparatus 300 such that the axis of the end effector 42, which coincides with the second axis B of the parallel mechanism device 20, is oriented horizontally for operating on a vertical operable surface 43 of the workpiece 44.

Figure 9:
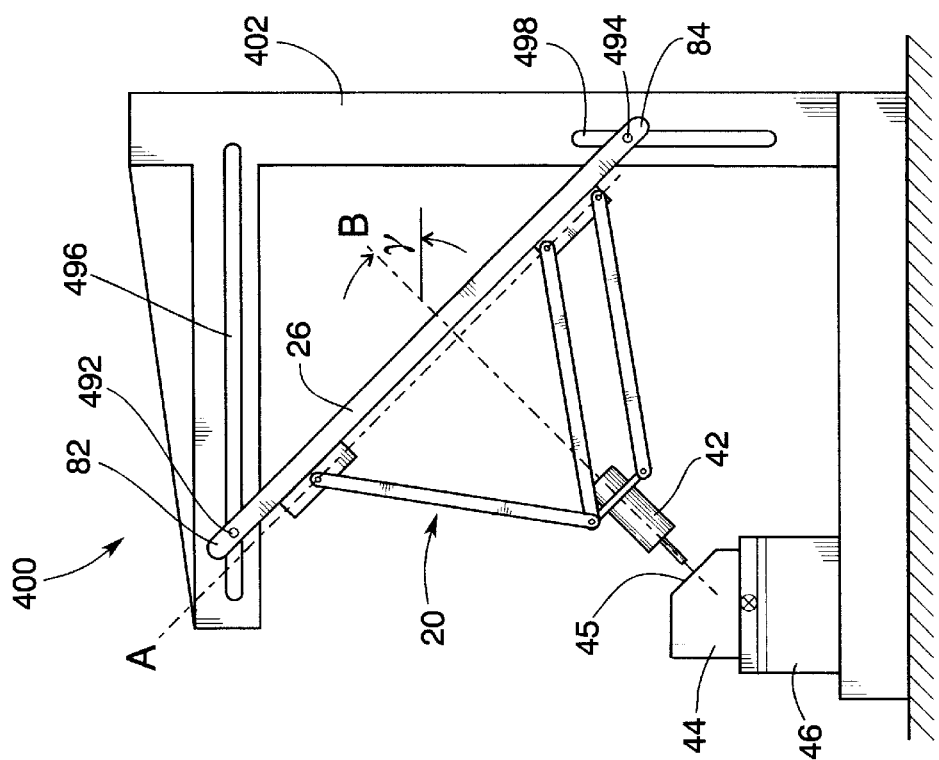
FIG. 9 is a front view of an embodiment of a reconfigurable apparatus according to the present invention.

FIG. 9 illustrates an embodiment of a reconfigurable apparatus 400 having a frame 402 that supports a parallel mechanism device 20, such that the axis B of the end effector 42, which coincides with the second axis B of the parallel mechanism device 20, is oriented at an angle γ relative to the horizontal direction for operating perpendicularly to an inclined operable surface 45 of the workpiece 44. The angle γ may be changed by reconfiguring the orientation of the parallel mechanism device 20. For example, the base 26 of the parallel mechanism device 20 may be a bar that has first and second ends 82, 84, which pivot about first and second pins 492, 494 respectively. The first and second pins 492, 498 can slide along respective reconfiguration guides, such as two orthogonal slots or grooves 496, 498 on the frame 402, thereby changing the direction of the second axis B of the parallel mechanism device 20. The pivoting motion of the base 26 may also be effected by any other pivoting arrangements known in the art, such as, for example, by mating guides and riders, pulleys, etc., and may also be automatically controlled. It will be appreciated that other reconfiguration structures known to a skilled artisan may be used.

Figure 10:
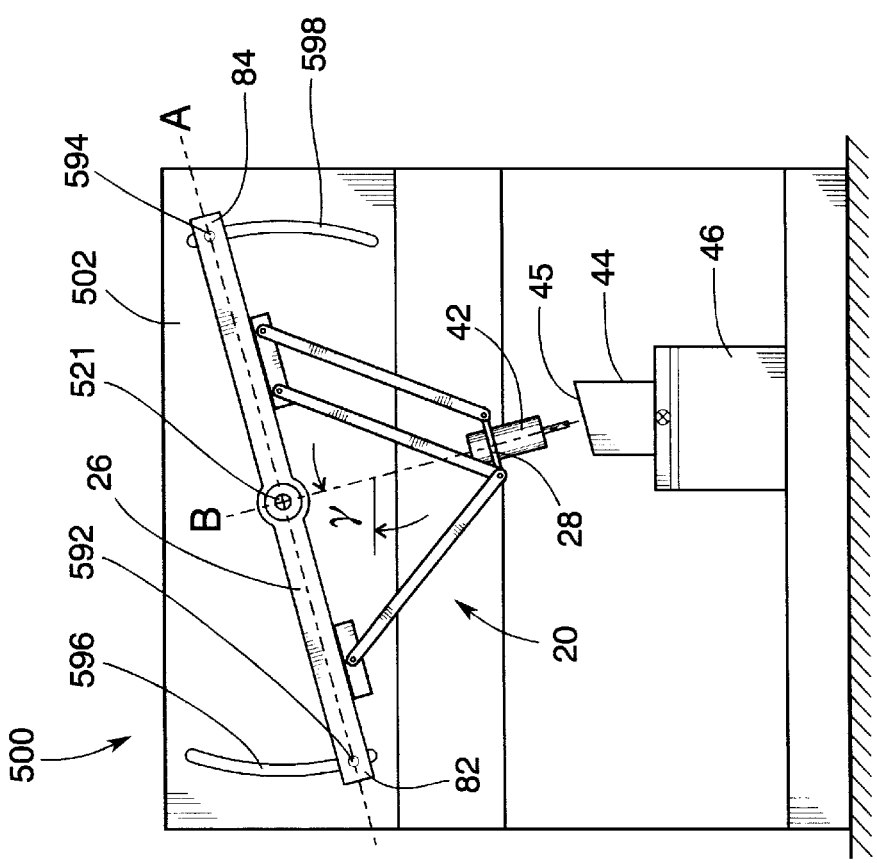
FIG. 10 is a front view of an embodiment of a reconfigurable apparatus according to the present invention.

FIG. 10 illustrates another embodiment of a reconfigurable apparatus 500 having a frame 502 that supports a parallel mechanism device 20, such that the axis B of the end effector 42 is oriented at an angle γ relative to the horizontal for operating on an inclined operable surface 45 of the workpiece 44. The base 26 of the parallel mechanism device 20 has first and second ends 82, 84 and may rotate about a pivot pin 521 relative to the frame 502. As the base 26 rotates about the pivot pin 521, the first and second ends 82, 84 of the base 26 may be guided by first and second pins 592, 594 through respective arcuate or curved first and second reconfiguration guides known in the art, such as slots or grooves 596, 598 on the frame 502, thereby changing the orientation of the second axis B, and therefore the angle γ. The range of change of the angle 7 may depend upon the length and shape of the first and second curved slots 594, 598, and may be varied accordingly.

Figure 11:
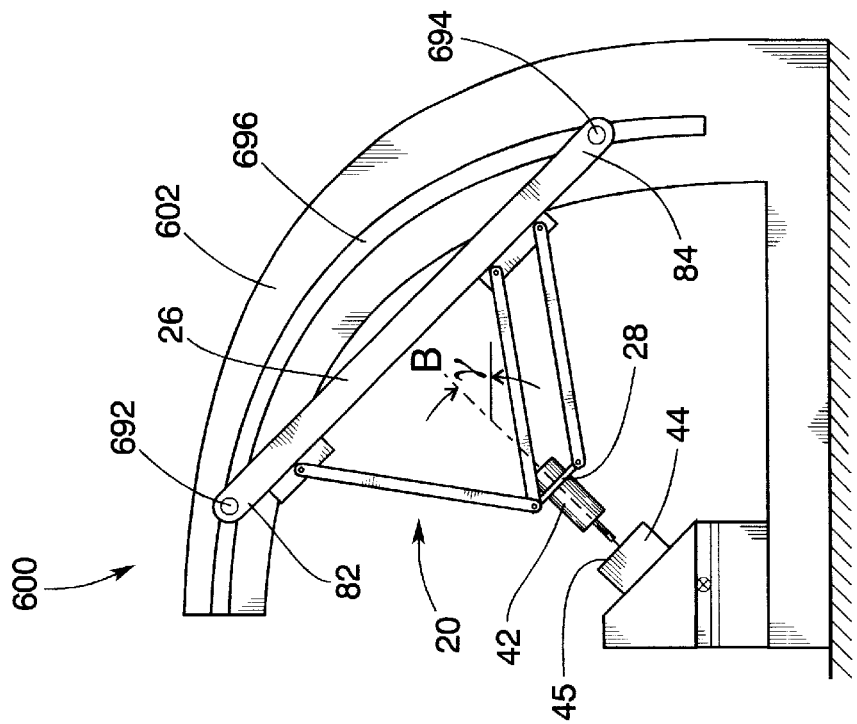
FIG. 11 is a front view of an embodiment of a reconfigurable apparatus according to the present invention.

Another embodiment of a reconfigurable apparatus 600, shown in FIG. 11, includes a frame 602 that supports a parallel mechanism device 20. The frame 602 has an arched reconfigurable guide 696 thereon. The base 26 of the parallel mechanism device 20 has first and second ends 82, 84 that may pivot about respective first and second pins 692, 694. The first and second pins 692, 694 can slide along the arched reconfigurable guide 696 for reconfiguring the orientation of the second axis B of the parallel mechanism device, in relation to a workpiece 44 with an inclined operable surface 45, by changing the angle γ of the second axis B in relation to the horizontal.

Figure 12:
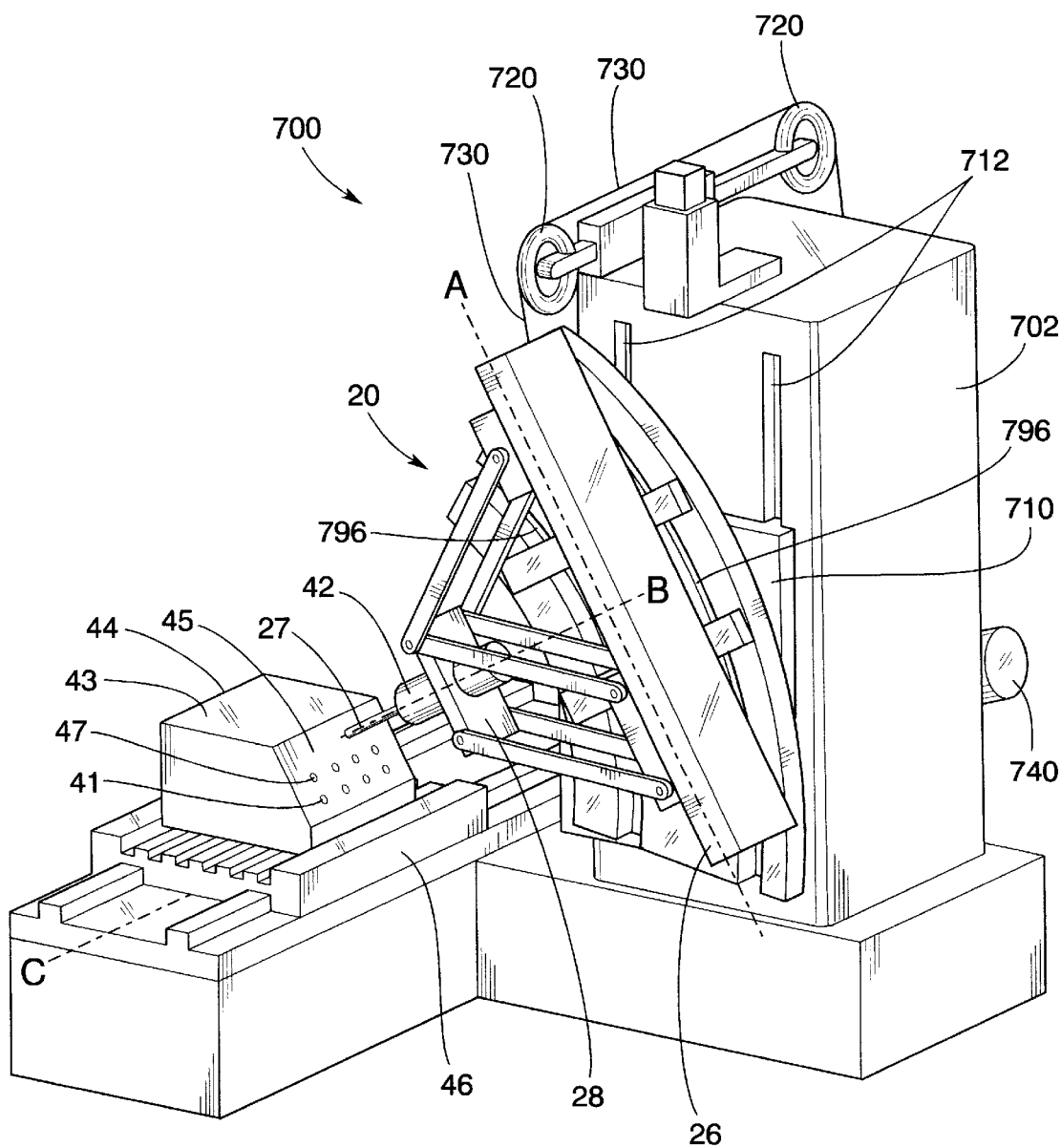
FIG. 12 is a perspective view of an embodiment of a reconfigurable apparatus according to the present invention.

FIG. 12 illustrates an embodiment of an apparatus 700 that includes a reconfigurable arch frame 702 that supports a parallel mechanism device 20. The base 26 of the parallel mechanism device 20 may pivot along arched reconfiguration guides 796 that are formed on or supported by a platform 710, so that the orientation of the tool axis, which coincides with the second axis B of the parallel mechanism device 20, may be changed for machining operations on an inclined operable surfaces 45 of the workpiece 44. The platform 710 is movable along reconfiguration guides 712 formed on the frame 702, such that the parallel machine device 20 can be moved to different height from a table 46 that supports the workpiece 44. The table 46 may be linearly actuated along a third axis C, which is orthogonal to the first and second axes A, B of the parallel mechanism device 20.

In a drilling operation, for example, the end effector 26 holds a drill bit 27 aligned along the second axis B. The parallel mechanism device 20 may be reconfigured by moving the base 26 relative to the arched reconfiguration guides 796 of the platform 710, such that the drill bit 27 is oriented in a direction perpendicular to the inclined operable surface 45 of the workpiece 44. As the table 46 moves along the third axis C, a first series of holes 41 may be drilled on the operable surface 45. The parallel mechanism device 20 may then be moved to a different height relative to the table 46, by moving the platform 710 relative to the reconfiguration guides 712 of the frame 702, and a second series of holes 47 may then be drilled on the operable surface 45. The movement of the platform 710 may be effectuated by any conventional mechanisms, such as a system of pulleys 720, cables 730 and weights 740, or by automated drivers or actuators.

Figure 13:
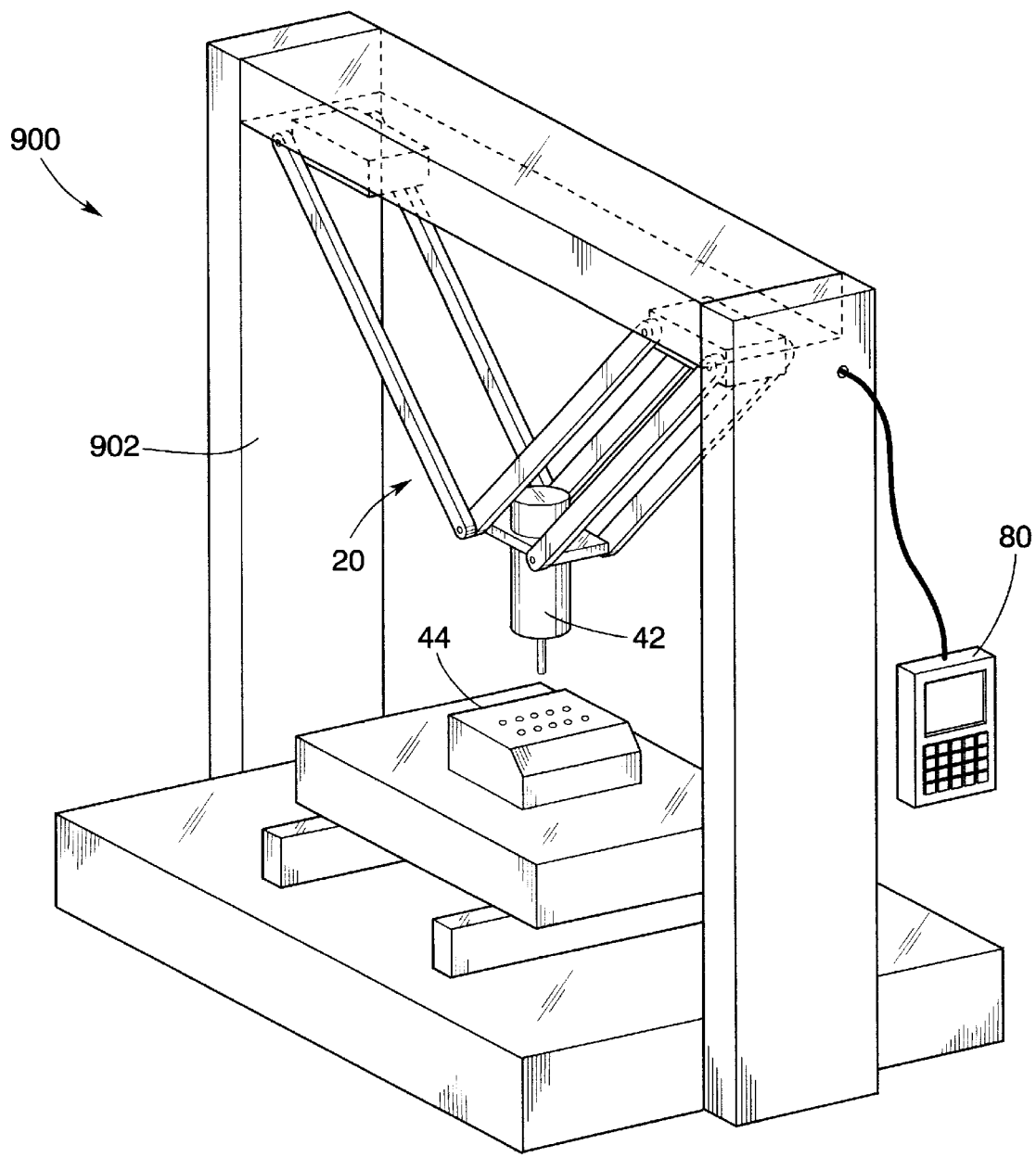
FIG. 13 is a front view of an embodiment of an apparatus according to the present invention.

The operation of the end effector 42 and the operating path configuration may be controlled by a computer or a control device 80, such as, for example, a portable teach pendant, as shown in FIG. 13. FIG. 13 depicts an embodiment 900 of an apparatus in which a parallel device mechanism 20 is mounted on a C frame 902. The control device 80 may include open architecture software that is compatible with diverse manufacturing environments, and an appropriate human machine interface, as known in the art.

Figure 14:
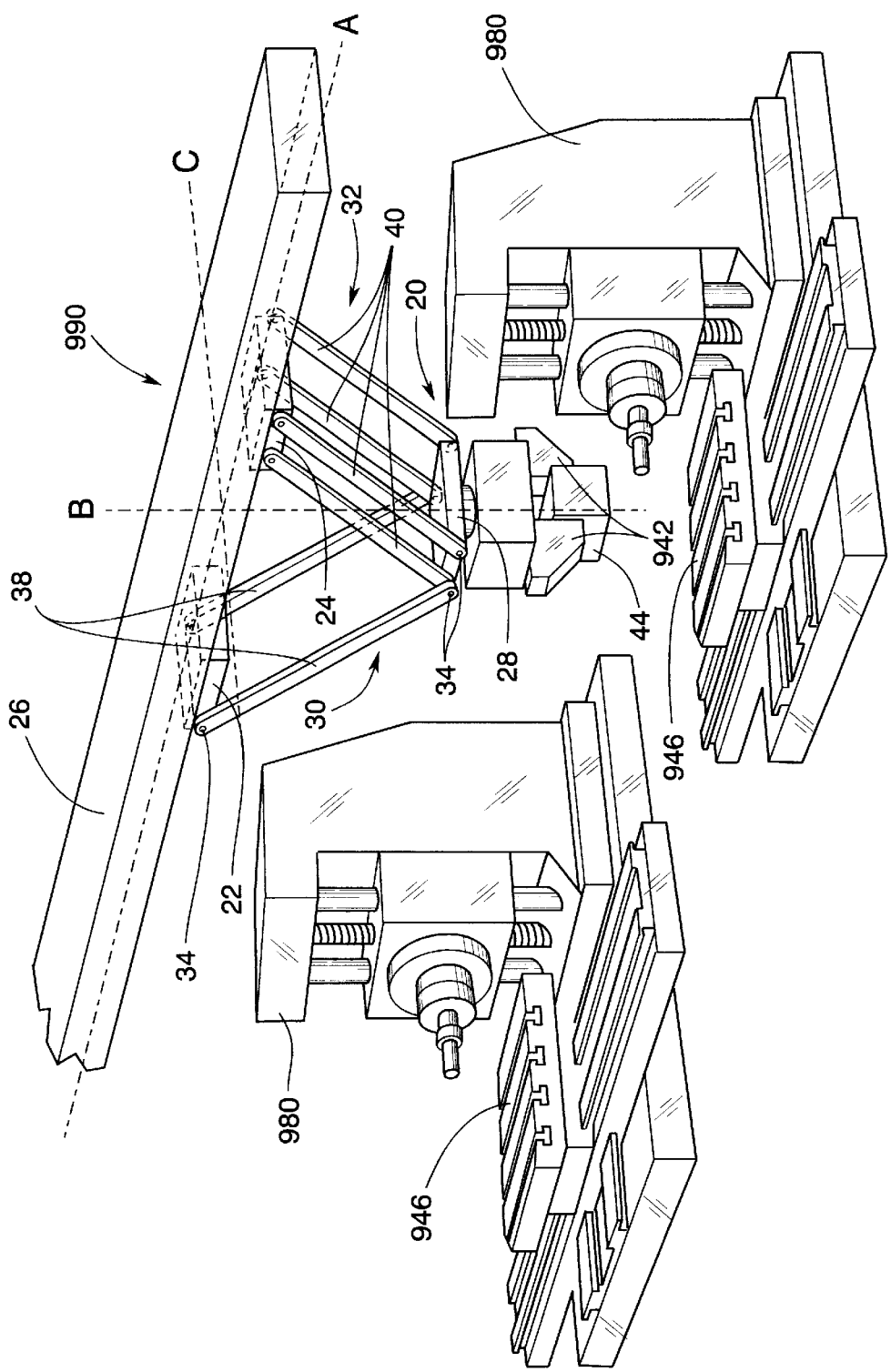
FIG. 14 is a perspective view of an embodiment of an apparatus according to the present invention shown in a first position.
Figure 15:
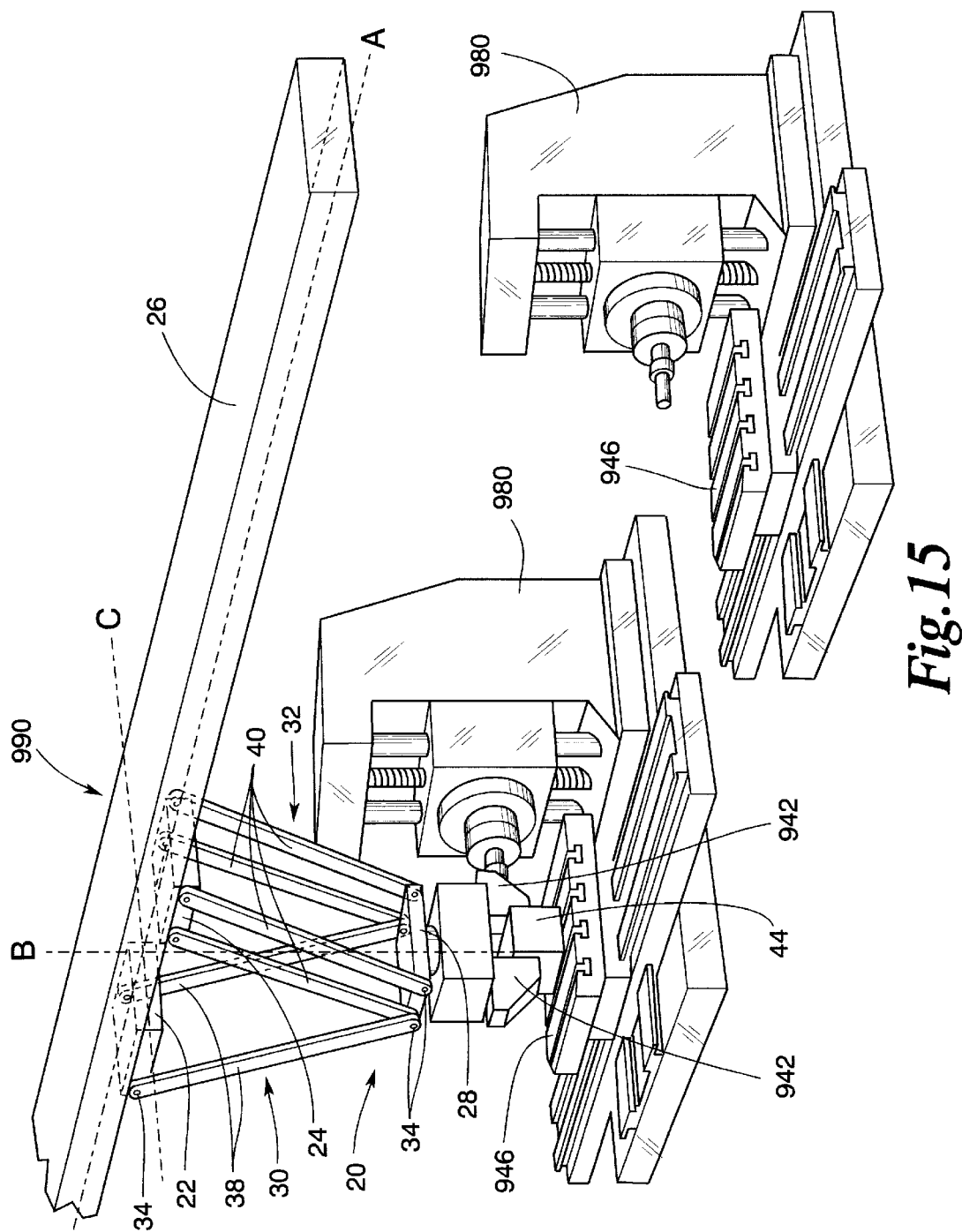
FIG. 15 is a perspective view of the apparatus of FIG. 14 shown in a second position.

FIGS. 14 and 15 illustrate another embodiment of an apparatus 990 that incorporates a parallel mechanism device 20 with two degrees of freedom along first and second coplanar axes A and B, as described herein above. The apparatus 990 may be, for example, a high-speed monorail gantry, in which the end effector 42 is a gripper having an axis aligned along the second axis B. The second axis B is coplanar and orthogonal to the first axis A that is defined by the linear motion of the first and second slides 22, 24 of the parallel mechanism device 20. The apparatus may be used to transport a workpiece or part 44 to one or more machine stations 980 in a production line along the first axis A. During transport, the first and second slides are in a first position in which the workpiece 44 is held above the level of the tables 946 of the machine stations, as shown in FIG. 14. When the workpiece 44 reaches the next station in the production line, the first and second slides 22, 24 move toward each other, lowering the workpiece 44 along the second axis B onto the table 946, where it may be released, as shown in FIG. 15.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit invention. The preceding description, therefore, is not meant to limit the scope of the invention. Rather the scope of the invention is to be determined only by the appended claims and their equivalents.

What is claimed is:

1. A reconfigurable apparatus comprising:
   a frame;
   first and second linearly-actuated slides supported on a base reconfigurably coupled to a reconfiguration guide on the frame so that the base is movable to be reconfigured, wherein the first and second slides are movable along a line defining a first axis;
   a mobile platform;
   a first driving connector movably coupled to the first slide and to the mobile platform, and a second driving connector movably coupled to the second slide and to the mobile platform, such that the mobile platform is displaceable within at least two degrees of freedom defined by linear motions along the first axis and a second axis, the second axis being coplanar and orthogonal to the first axis; and
   an end effector coupled to the mobile platform, the end effector having an axis aligned in a direction defined by the second axis.

2. The apparatus of claim 1, wherein the reconfiguration guide is arched.

3. The apparatus of claim 1, wherein the end effector comprises a machining tool.

4. The apparatus of claim 3, wherein the base is connected to the frame such that the orientation of the machining tool is reconfigurable.

5. The apparatus of claim 1, wherein the reconfiguration guide comprises two orthogonal reconfiguration guides on the frame.

6. The apparatus of claim 1, wherein the reconfiguration guide comprises at least one curved reconfiguration guide on the frame.

7. The apparatus of claim 1, further including a controller operably coupled to the first and second slides.

8. The apparatus of claim 7, wherein the controller comprises a teach pendant.

9. The apparatus of claim 1, further comprising a table for supporting a workpiece, the table being linearly actuated along a third axis, the third axis being orthogonal to the first and second axes.

10. The apparatus of claim 1, wherein the first driving connector comprises two parallel links.

11. The apparatus of claim 1, wherein the second driving connector comprises four parallel links.

12. The apparatus of claim 1, wherein the end-effector is a gripper.

13. The apparatus of claim 12, wherein the gripper is operable to hold a workpiece in a first position during transport from first machine station to a second machine station along the first axis and to release the workpiece in a second position at the second machine station.

14. The apparatus of claim 1, wherein the end-effector is a drilling tool.

15. An apparatus comprising:
   a frame;
   first and second linearly-actuated slides supported on a base connected to the frame, wherein the first and second slides are movable along a line defining a first axis;
   a mobile platform;
   a first driving connector movably coupled to the first slide and to the mobile platform, and a second driving connector movably coupled to the second slide and to the mobile platform, such that the mobile platform is displaceable within at least two degrees of freedom defined by linear motions along the first axis and a second axis, the second axis being coplanar and orthogonal to the fist axis;
   a first guiding connector and a second guiding connector, wherein the first and second guiding connectors are each movably coupled to the mobile platform and to the base; and
   an end effector coupled to the mobile platform, the end effector having an axis aligned in a direction defined by the second axis.

16. The apparatus of claim 15, wherein each of the first and second guiding connectors comprises two links, and each link is articulated.

17. The apparatus of claim 15, wherein the two links of at least one of the first and second guiding connectors are connected by a rod.

18. The apparatus of claim 15, wherein the base is connected to a reconfiguration guide on the frame.

* * * * *

UNITED STATES PATENT AND TRADEMARK OFFICE
CERTIFICATE OF CORRECTION

PATENT NO.    : 6,557,235 B1
DATED         : May 6, 2003
INVENTOR(S)   : Reuven R. Katz et al.

It is certified that error appears in the above-identified patent and that said Letters Patent is hereby corrected as shown below:

Column 1,
Line 2, prior to section heading "BACKGROUND" please insert heading
-- FEDERALLY SPONSORED RESEARCH --.
Line 3, after heading "FEDERALLY SPONSORED RESEARCH" please insert paragraph -- Certain of the research leading to the present invention was sponsored by the United States Government under National Science Foundation (NSF) Grant EEC 9529125. The United States Government has certain rights in this invention. --

Column 5,
Line 28, "angley" should be -- angle $\gamma$ --.
Line 60, "angle 7" should be -- angle $\gamma$ --.

Signed and Sealed this

Fifteenth Day of June, 2004

JON W. DUDAS
*Acting Director of the United States Patent and Trademark Office*